United States Patent [19]
Melanson

[11] Patent Number: 4,730,102
[45] Date of Patent: Mar. 8, 1988

[54] ELECTROCERAMIC HEATING DEVICES

[75] Inventor: Lionel J. Melanson, Casco, Me.

[73] Assignee: GTE Products Corporation, Stamford, Conn.

[21] Appl. No.: 906,876

[22] Filed: Sep. 15, 1986

[51] Int. Cl.$^4$ .......................... H05B 3/08; H01C 1/44
[52] U.S. Cl. ..................................... 219/541; 338/329
[58] Field of Search ...................... 219/541, 504, 505; 338/22 R, 329; 228/4.5, 110, 111

[56] References Cited
U.S. PATENT DOCUMENTS
3,793,604 2/1974 Duggan et al. ..................... 338/329
4,619,397 10/1986 Urban .................................. 228/4.5

Primary Examiner—Harold Broome
Attorney, Agent, or Firm—James Theodosopoulos

[57] ABSTRACT

An electroceramic heater including a pair of metallized electrodes disposed upon the sides of an electroceramic body and a pair of lead wires ultrasonically welded and metallurgically to the electrodes, with the inner ends of the wires being swaged such that they have a generally flat appearance.

12 Claims, 3 Drawing Figures

ELECTROCERAMIC HEATING DEVICES

This invention relates to metallized electroceramic heating devices and particularly to such devices having radially extending lead wires, the inner ends of which have been ultrasonically welded to the devices.

BACKGROUND OF THE INVENTION

Metallized electroceramic heating devices are generally made from doped barium titinate ceramics which have a sharp positive temperature coefficient of resistance. The ceramics are designed such that below a critical temperature, the resistance of the ceramic remains at a low value and is essentially constant. When a particular temperature is reached, a crystalline phase change takes place in the ceramic and this change in crystalline structure is accompanied by a sharp increase in the resistance at the crystalline grain boundaries. The result of this crystalline change is an increase in the heater resistance of several orders of magnitude over a small temperature change. For example, barium titinate heaters with a room temperature resistance of 3.0 ohms can increase to 1,000 ohms or more during the crystalline phase change. The temperature at which the cyrstalline phase change takes place can be adjusted in the manufacturing process through the use of appropriate chemical additives and can attain temperatures as high as 300° C., and even higher.

Commonly, current is carried to the device by means of wires that are attached to the metallized coatings which form the electrodes on the electroceramic body. If attachment is by way of soldering, when making devices that can operate temperatures as high as 300° C., special solders or solder pastes frequently have to be used, together with special fluxes. These special fluxes may seriously harm the devices since they can impregnate the grain boundaries of the ceramic when the device is operated and cause detrimental changes to the resistivity of the heater.

While the soldering method is the most common way to attach leads to the heaters, other methods are also used. Such methods include resistance welding and laser welding and each of these methods will produce a satisfactory product. Resistance methods, however, are somewhat limited because of the necessity of compatibility of melting points, coefficients of expansion and chemical compositions. Such requirements can pose severe limitations on the selection of materials necessary to build the heater. On the other hand, laser welding methods require the use of extremely expensive equipment to produce a relative inexpensive product.

SUMMARY OF THE INVENTION

According to the present invention, I have discovered that ultrasonic metal welding techniques can be used to attach lead wires to thermally metallized electrodes which have been coated on the body of an electroceramic heating device. Ultrasonic welding is achieved when one of the parts is scrubbed against another part under pressure and at high speeds. The scrubbing action is a reciprocating linear motion with a total displacement between about 1 and 5 mils at a rate of 20,000 cycles per second. The scrubbing action of the ultrasonic welding breaks up and disperses oxides and contamination on the interfacial surfaces of the wires and the metallized coatings, mechanically mixes the materials together and thus, generates a metallurgical weld of the two parts.

The heater of the present invention includes a pair of metallic electrodes, electrically insulated from each other, and disposed as a coating on both sides of the substrate of electroceramic material. The heater is capable of producing heat upon application of current to the electrodes. Lead wires are attached to each of the electrodes and extend outwardly from the body of the substrate. The lead wires are ultrasonically welded to the metallized electrodes whereby the material of the electrodes is mechanically mixed with the material of the lead wires and thus are metallurgically bonded to each other. The lead wires are swaged during the ultrasonic welding such that the width of the wires becomes greater near the center of the heater than at edge, whereby the weld strength if increased and the possibility of wire breakage, or separation of the wire from the electrode, or delamination of the metallized coating and the wire from the body, is reduced.

The metallized electrodes, in the preferred embodiment, are disposed inside of the perimeter of the body of the electroceramic material, whereby to form uncoated shoulders around the edges of the body and to provide electrical insulation of the electrodes from each other. The swaging is such that the lead wires are at least 25%, and preferably 50% wider than the wire. The balance of the swaging is such that the wire is truncated toward the shoulder and outer end.

When the wire is swaged, the shape of the cross section of the swaged section is generally oval and the cross section of the remainder of the wire is generally circular. The ultrasonic welding techniques, I have found, work best with nickel, copper or aluminum lead wires and metallized coatings of similar metals since these materials are most amenable to both swaging and ultrasonic welding, taking into consideration the physical properties of the ceramic substrate.

With the ultrasonic welding techniques of the present invention, one piece of the metallized ceramic substrate is held stationary in an anvil tool and the other piece, the lead wire, is placed on the metallized surface and vibrated under pressure with the ultrasonic tool tip. The partially fabricated device is then turned over and the process is repeated with another lead wire so that the leads are welded to each of the metallized surfaces. The anvil tooling has been specifically designed so as to swage the lead wire as described previously and provide the flattened surface to the inner end of the wire.

DESCRIPTION OF THE PREFERRED EMBODIMENTS

Figure 1:
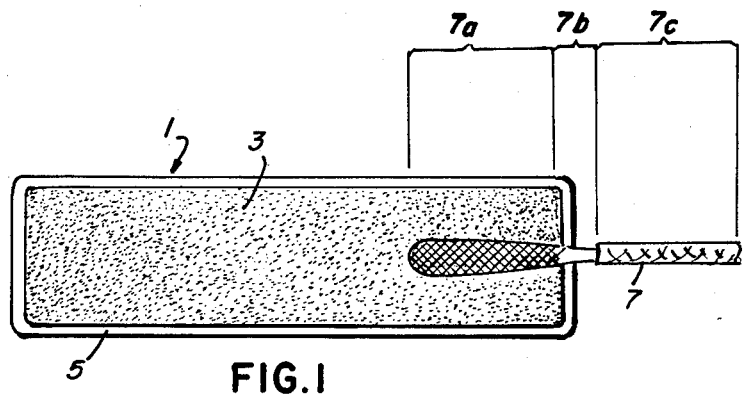
FIG. 1 is a perspective view of the heater of the present invention showing a metallized surface, the ceramic that forms the body of the heater, and the ultrasonically-attached lead wires.
Figure 2:
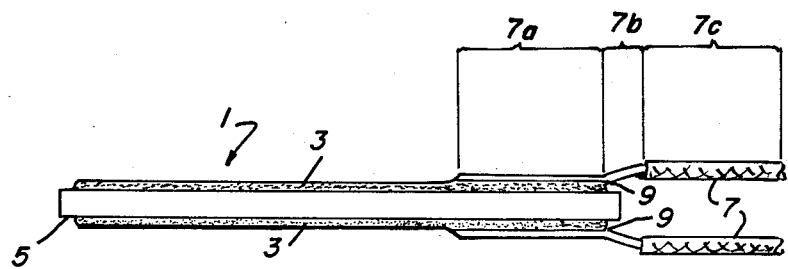
FIG. 2 is a side elevational view of the heater shown in FIG. 1.

Referring now to FIG. 1, the electroceramic device has a thermally sprayed. metallized surface that forms the electrodes 3 which are disposed upon the ceramic substrate 1. The electrodes 3 are separated from each other by the substrate 1 and shoulders 5 which are disposed around the perimeter of the substrate 1. The substrate 1 is made in a flat shape and is formed, generally, of doped barium titinate ceramics which have a sharp positive temperature coefficient of resistance. The device is designed such that below a critical temperature, the resistance of the ceramic remains at a low value and is essentially constant. When the cereamic's anomaly temperature is reached, a crystalline phase change takes place in the ceramic and this change in crystal structure is accompanied by the sharp increase in the resistance at the crystalline grain boundaries. The result of this crystalline change is an increase in the heater resistance of several orders of magnitude over a very small shift in temperature. The temperature at which the crystalline phase change takes place can be adjusted in the manufacturing process through the use of appropriate chemical dopents and can be varied between 50° C. and 300° C. and even higher. When energized with a suitable voltage by applying current to the opposite sides of the device, the ceramic rapidly heats up to its predetermined operating or anomaly temperature and then "locks in" at this temperature.

This rapid heating is due to the initial low resistance of the ceramic which results in an internal high power of the heater. The "lock in" is due to the abrupt increase in resistance which causes generated power to be reduced until it equals dissipated power. At this point, thermal equilibrium is achieved and the substrate 1 self-regulates itself at the temperature.

The lead wire 7 is attached to each of the metallized electrodes 3. The lead wire 7 is divided into three sections for the purposes of explaining my invention. At its inner end 7a, the lead wire is swaged and ultrasonically welded to the metallized surface 3. Intermediate section 7b is disposed between outer and 7c and inner end 7a. The intermediate section 7b of the lead 7 commences where the weld between the metallized surface 3 and the inner end 7a terminates. The location of the other end of the intermediate section 7b is less easy to define, but for purposes of explaining this embodiment, it can be considered as being located on a plane that is normal to the edge of the ceramic body 1.

Inner end 7a is preferably swaged during the welding process to flatten it at one end and provide the juncture 9 at the other end where the inner end 7a separates from the electrode 3 and the intermediate section 7b commences. The swaging flattens the lead wire 7 into a generally oval cross-sectinal shape at its inner end 7a and distorts the wire such that its long diameter is at least 25% wider and preferably 50% wider than the diameter of the outer end 7c. As will be discussed later, the swaging can be accomplished either by shimming the anvil of the ultrasonic welder or by having the welding tip engage the wire such that the desired swaging is accomplished.

In the manufacture of the heater, a fired electroceramic substrate is sprayed with a thermally metallized coating of copper, nickel or preferably aluminum. The edges of the substrate are masked during the coating process whereby a shoulder is formed which will prevent the coating on one side of the substrate from touching the coating on the other side. While the coatings are textured as a result of the metallizing process, that is they have a rough external appearance, the average thickness is generally about 8 and 20 mils with a density of approximately 2.4 gm./cc. While the coating thickness is not necessarily critical, sufficient coating should be disposed on the substrate to provide a good electrode and enough of a base for the placement of the lead wires. I have found that the ultrasonic welding process requires the above-mentioned minimum electrode thickness, depending upon the lead wire's size and composition. On the other hand, if the coating thickness is substantially greater than the stated range, there is a tendency during use for the electrode to delaminate and separate from the ceramic substrate thereby destroying the device.

Figure 3:
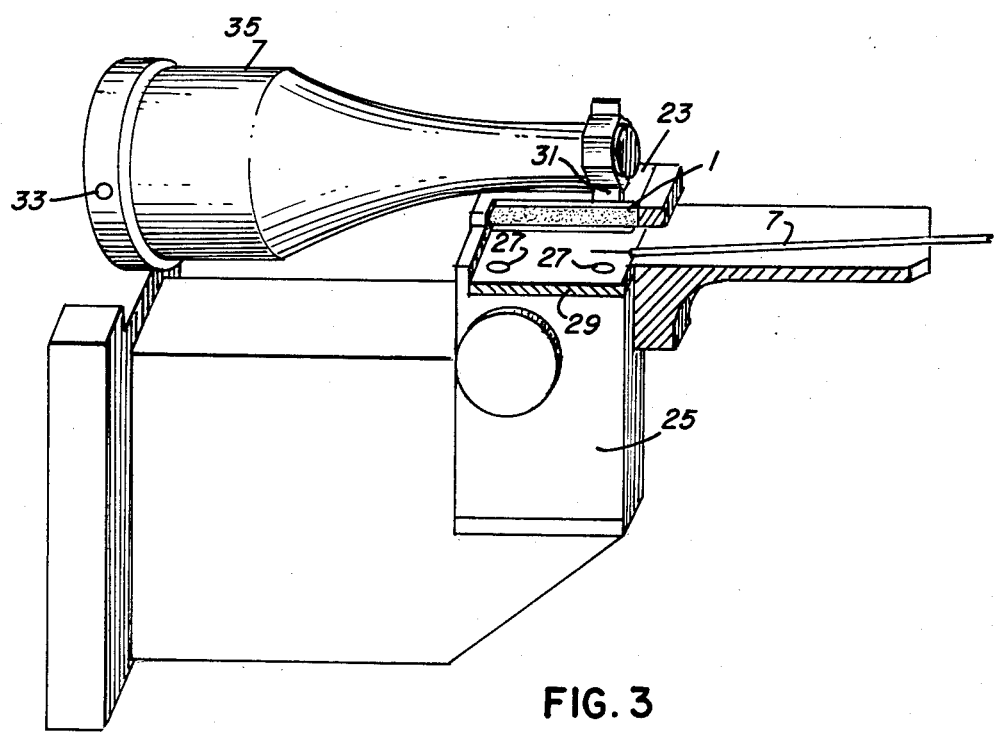
FIG. 3 is a perspective view of an ultrasonic welding device that can be used to weld the lead wires to the metallized surfaces of the heater of the present invention.

Turning now to FIG. 3, a metallized electroceramic device 1 is disposed in a nest in an anvil 23. Anvil 23 is attached to frame 25 by means of screws disposed in holes 27. The anvil 23 can be shimmed to pivot radially about an axis 33 which is one method for establishing the width of the swage on the inner end 7a of the wire 7. In the operation of the ultrasonic welded, the wire 7 is clamped in place between the metallized surface of the device 1 and the tool tip 31. Tool tip 31 swings in an arc around an axis 33 at the end of a horn portion 35 of the ultrasonic welder. The tool tip 31 engages the wire 7 and vibrates it at a rate of 20,000 cycles per second which produces the scrubbing action between the wire and the coating which will break up and disperse oxides and other surface contamination, mechanically mix the material together and generate a metallized weld between the parts. The ultrasonic welding equipment that I prefer includes a power supply that converts AC line voltage to 20 KHz. electrical energy. The energy is then applied to a converter where it is changed to mechanical vibration. The vibrations are transmitted to an acoustic coupling system to the welding tip 31 and through the tip 31 to the lead wire 7 and the ceramic heater 1. Preferably, the tool tip 31 should be set upon the lead wire 7 only for a sufficient time to swage the wire and weld pieces together at a pressure of 20 PSI.; 0.1 to 0.3 seconds generally being sufficient.

It is apparent that modifications and changes can be made within the spirit and scope of the present invention, but it is my intention, however, only to be limited by the scope of the appended claims.

As my invention, I claim:

1. An electroceramic heater comprising:
    a body of electroceramic material, said body having an outer edge and two sides, each of the sides having an interior face, said body having an electrode disposed on each of said faces, said body further being capable of producing heat upon application of current to said electrodes, said electrodes being formed of metallic coatings selected from the group consisting of aluminum, copper and nickel, said electrodes further having rough external surfaces and being electrically insulated from each other, the average thickness of said electrodes being between about 8 and 20 mils;
    a lead wire extending outwardly from each of the metallic electrodes, said lead wire being selected from the group consisting of aluminum, copper and nickel, each of said lead wires being ultrasonically welded to said electrodes, said lead wires each being swaged such that the width of the ends of the wires is greater nearer the interior faces of the heater than at the outer edge, the metal of said lead wires being mechanically mixed with the metal of said electrodes at said welds.

2. The heater according to claim 1 wherein the metallic electrodes are disposed inside of the perimeter of said body, whereby to form uncoated shoulders around the outer edge of said body and to provide electrical insulation of the electrodes from each other.

3. The heater according to claim 2 wherein the width of the swaged section of the wire is at least about 25% greater than the diameter of the wire.

4. The heater according to claim 1 wherein the wires have inner ends ultrasonically welded to the metallic electrodes and outer ends that extend radially beyond the body of the electroceramic material; and an intermediate section disposed therebetween, adjacent the uncoated shoulder formed on the body of the electroceramic material.

5. The heater according to claim 4 wherein the inner ends of the wires have a generally oval cross section and are swaged such that they have a long diameter that is at least about 25% wider than the diameter of the outer ends of the wires.

6. The heater according to claim 4 wherein the swaging is such that the diameter of the wires gradually increases from the intermediate sections towards the inner ends.

7. The heater according to claim 1 wherein the wires extend radially outwardly from said body and the wires have a generally round cross section at the radial extension and become generally oval where they are welded to said metallic coatings, the ovalarity commencing at said intermediate sections of said wires.

8. A process for manufacturing an electroceramic heater, the steps which comprise:

disposing on a support an electroceramic heater formed of a body of electroceramic material, and a pair of spaced, rough textured coatings, said coatings being disposed on said body such that an outer edge of said body remains uncoated, said coatings being formed of a metal selected from the group consisting of copper, aluminum and nickel, said coatings further having an average thickness of between about 8 and 20 mils;

disposing a lead wire formed of a metal selected from the group consisting of aluminum, copper and nickel, upon one of said coatings whereby an end of said lead wire will extend outwardly from said body;

urging a tool tip against said wire and vibrating said tool tip at ultrasonic frequencies while said tool tip is being urged against said wire, said tool tip urging with sufficient force to swage said wire, and simultaneously scrubbing said wire and said coating and thereby breaking up and dispersing oxides and mechanically mixing the metal of said coating and the metal of said lead wire with said ultrasonic vibrations, whereby said lead wire is rigidly joined to said coating;

turning over said heater on the support and laying a second wire on the other side and repeating the scrubbing and mixing with ultrasonic vibrations whereby two lead wires are welded to said coating, each to opposite sides of heater.

9. The process according to claim 8 wherein said coatings have a thickness of approximately 2.4 gm./cc. grams per cc.

10. The process according to claim 8 wherein the tool tip is urged against said wire with a pressure of approximately 20 pounds per square inch.

11. The process according to claim 10 wherein the tool tip is urged against said wire for a time between about 0.1 and 0.3 seconds.

12. The process according to claim 8 wherein the tool tip vibrates at a rate of approximately 20,000 cycles per second.

* * * * *